INVENTOR.
CHARLES E. BODEY
BY
ATTORNEY 3,229,656
MANIPULATOR ARM ATTACHMENT
Charles E. Bodey, Los Angeles, Calif., assignor to
North American Aviation, Inc.
Filed June 25, 1964, Ser. No. 377,836
4 Claims. (Cl. 114—.5)

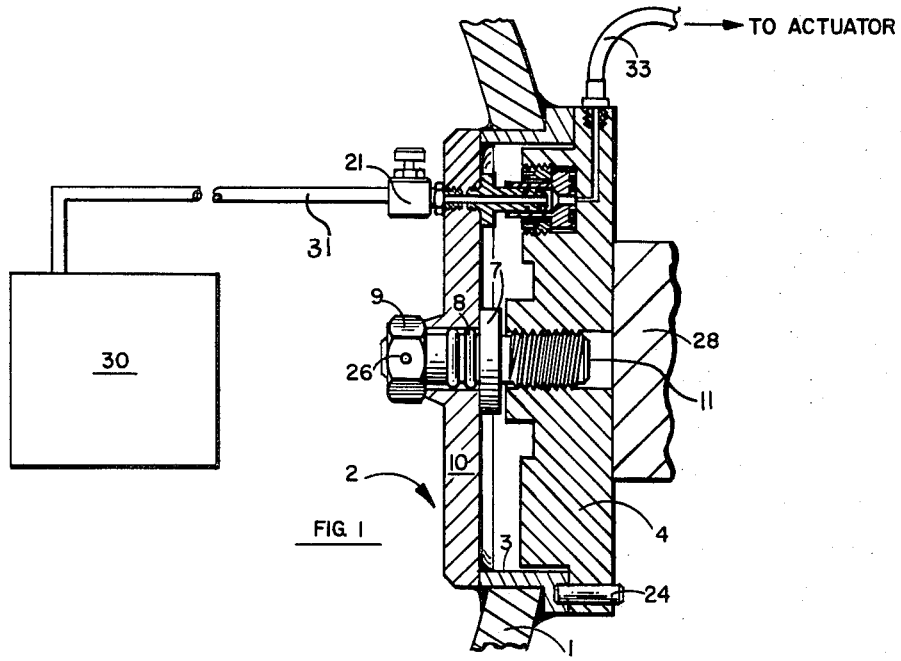
FIG. 1
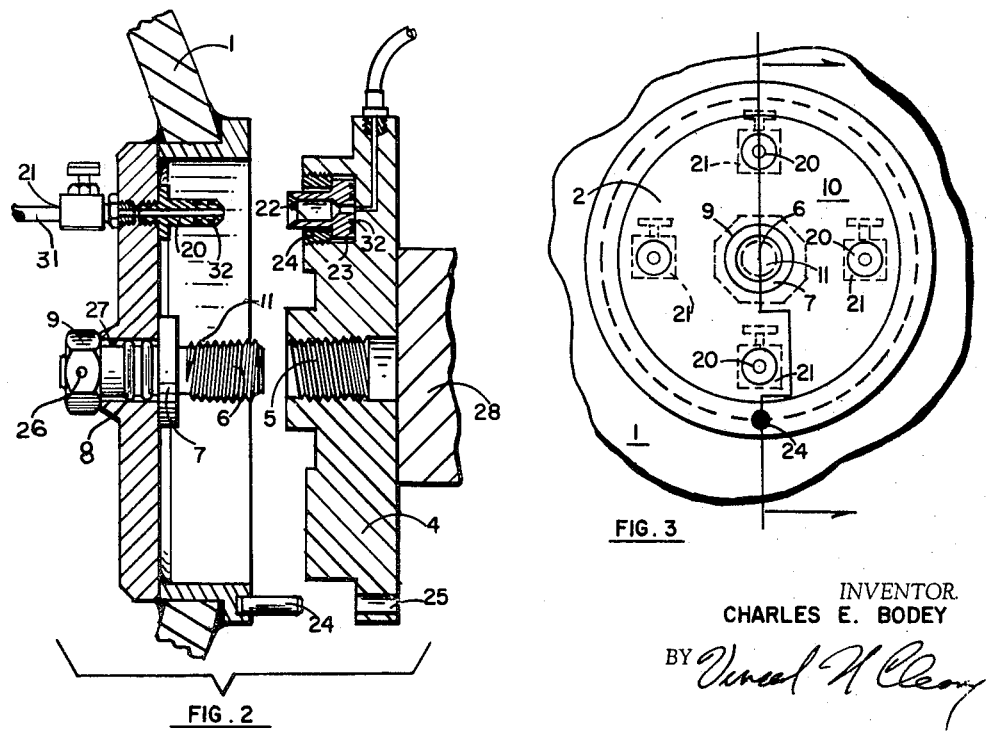
FIG. 2
FIG. 3
INVENTOR.
CHARLES E. BODEY
BY Vincent N. Cleary
ATTORNEY Jan. 18, 1966   C. E. BODEY   3,229,656
MANIPULATOR ARM ATTACHMENT
Filed June 25, 1964   2 Sheets-Sheet 2

This invention relates to a manipulator arm attachment and more specifically to a device for attaching remote handling manipulators to a sub-sea vessel whereby the manipulators may be disengaged from within the vessel.

In the art of developing remote handling manipulators for a sub-sea vehicle, it is important that the manipulator arms be easily attached, or disconnected, to provide maintenance and servicing of the arms, to permit attachment of only the number of arms required for a particular task, to permit dropping of a manipulator arm by action from inside the vehicle in case of emergency such as entanglement or the need to reduce weight and to minimize the hydrodynamic drag of the vehicle on an optimum basis.

In the present invention the rotation of one centrally located jack-screw provides both the mechanical attachment of the arm and the connection of a multiplicity of circumferentially located hydraulic connections.

A particular feature of the present invention in the provision of a floating action of the individual female hydraulic connectors so small amounts of misalignment do not comprise the quality of the hydraulic connections during attachment or due to the small movements when the manipulator arm is in service.

A principal object, therefore, of this invention is to provide a means for disconnecting a manipulator arm from within a sub-sea vehicle.

A further object of this invention is the provision of a device which connects and disconnects both the mechanical and power connections between the vehicle and manipulator arm at the same time.

Yet another object of this invention is to provide a means for quickly connecting and disconnecting manipulator arms from sub-sea vehicles.

These and other objects of invention will become apparent from the following description taken in connection with the accompanying drawings in which:

FIG. 1 is a cross section view of an embodiment of the invention with the manipulator arm secured to sub-sea vessel hull;

FIG. 2 is a cross section view of the embodiment in FIG. 1 with the manipulator arm detached from the vessel;

FIG. 3 is a front view of the receptacle with the manipulator arm removed, illustrating the relative placement of parts;

Figure 4:
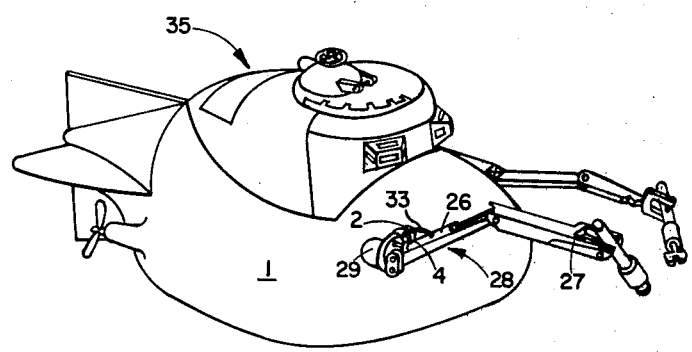
FIG. 4 is a pictorial view illustrating the mounting of a pair of manipulator arms to a sub-sea vessel by a connector embodying the invention.

Referring to the drawings, wherein like reference characters designate like or corresponding parts throughout the several views, there is shown in FIGS. 1, 2 and 3 a receptacle member 2 having cylindrical inner side walls 3 and a base member 10. The receptacle 2 is fixedly mounted through an opening in the hull 1 of vehicle 35 (shown in FIG. 4). Although cylindrical side walls are used, due to ease of machining, it would be obvious to incorporate other well known shapes.

A bolt 11 with a threaded projecting portion 6 is mounted within a circular opening 27 in the center of base member 10. A nut 9 is fixed to the end of the bolt projecting within the vehicle by a locking pin 26. A circular flange member 7 is fixedly mounted on bolt 11 within the base member 10, preventing longitudinal motion but allowing rotational motion of bolt 11.

The O rings 8 seal the opening 27 against possible leaks of sea water. A plurality of male hydraulic fittings 20 are mounted through the base member 10 and in turn are connected to a source of hydraulic power 30 by valves 21 and tubing 31. The manual shut-off valves 21 close the oil supply, located in power source 30, against sea water or other contamination when an arm 28 is not attached to the vehicle.

The manipulator arm 28 (shown completely in FIG. 4) has attached thereto a cylindrical projecting member 4 which is adapted to fit within the cylindrical walls 3 of receptacle 2. The projecting member 4 has a screw-threaded bore 5 which is adapted to receive the threaded portion 6 of bolt 11. A plurality of female hydraulic fittings 22 are mounted within bores 23 by a threaded annual adjusting nut 24 which can be adjusted with a spanner wrench. It is to be noted that both radial and circumferential movement is permitted within the limits of the clearances designed into the adjusting nuts 24 which eliminates the need for ultra precise tolerances in the location of the respective bores 23. The O rings 32 seal the hydraulic fittings against leaks.

The plurality of female hydraulic fittings 22 are connected to various actuators, depicted by 26, 27 and 29, by tubings 33 to provide the actuators with power. The actuators in turn supply the arm with various degrees of movement. In practice there is a distinct advantage in having many different types of arms mounted to the vehicle and in having the ability to change the arms quickly.

In operation the large attaching jack-screw or bolt 11 is rotated by personnel from within the vehicle with a large socket wrench. When tightened it will pull the arm and its hydraulic fittings into place and provide an attainment force. When turned in the opposite direction, the bolt will drive the arm out of the receptacle 2 and will disconnect all the hydraulic connectors. A radial alignment pin 24 or key way fits into the hold 25 and assures that the arm cannot be meshed in the receptacle unless all of the hydraulic fittings are in proper alignment. The pin 24 will also serve to prevent rotation of the arm at the time it is being driven out of the receptacle by the bolt 11. This prevents damage to the hydraulic connectors.

Although the invention has been described and illustrated in detail, it is to be clearly understood that the same is by way of illustration and example only and is not to be taken by way of limitation, the spirit and scope of this invention being limited only by the terms of the appended claims.

I claim:
1. An attachment device for use with a sub-sea vehicle comprising
   a sub-sea vehicle hull having an opening defined by said hull;
   a receptacle having cylindrical inner side walls and a base member, said receptacle fixedly mounted within said opening to form an integral structure with said hull;
   a bolt having a projecting threaded portion rotatably mounted through said base member;
   means for rotating said bolt from within said hull;
   a plurality of first power connectors mounted through said base member;
   means for supplying power to said first connectors from within said vehicle;
   a manipulator arm having mounted thereto a plurality of power actuators, a cylindrical projection on said arm adapted to be received by said receptacle, said projection having a screw-threaded bore adapted to receive said threaded bolt and thereby securely attach said arm to said vehicle, said projection also having a plurality of second power connectors for transmitting power to said actuators, said second connectors being adapted to engage said first connectors when said projection is secured within said receptacle;

alignment means for aligning said projecting member with respect to said receptacle.

2. The device as claimed in claim 1 wherein said second connectors are mounted with a limited degree of freedom such that slight amounts of misalignment between said first and said second connectors is compensated for.

3. An attachment device for use with a sub-sea vehicle comprising;

a sub-sea vehicle hull having an opening defined by said hull;

receptacle member mounted within said opening to form an integral hull structure;

a jack-bolt rotatably mounted to and projecting through said member;

a power source mounted within said vehicle;

a plurality of first power connectors mounted through said member and connected to said power source;

valve means interposed between said power source and said first connectors for cutting off the flow of power to said connectors;

first means adapted to be received by said member, said means having a screw-threaded bore adapted to receive said jack-bolt, said means also having a plurality of second power connectors adapted to engage said first connectors when said means is secured to said member by said jack-bolt;

second means for aligning said jack-bolt with said threaded bore and for preventing rotation of said first means with respect to said hull when said bolt is rotated to attach and disconnect said first means.

4. The device as claimed in claim 3 wherein said first means is a remote handling manipulator arm having power actuators for achieving desired movements, said actuators being connected to said second connectors.

References Cited by the Examiner
UNITED STATES PATENTS

| | | | |
|---|---|---|---|
| 1,184,981 | 5/1916 | Morrison | 114—16.7 |
| 1,773,223 | 8/1930 | Duman | 114—16.7 |
| 2,040,956 | 5/1963 | Romano | 61—69 |
| 2,475,468 | 7/1949 | Andrews | 285—137 X |
| 2,510,125 | 6/1950 | Meakin | 285—137 X |
| 3,045,622 | 7/1962 | Kittredge et al. | 114—16.7 |
| 3,158,123 | 11/1964 | Froehlich | 114—16 |

MILTON BUCHLER, *Primary Examiner.*

T. M. BLIX, *Assistant Examiner.*